US012443145B2

(12) United States Patent
Allimann et al.

(10) Patent No.: US 12,443,145 B2
(45) Date of Patent: Oct. 14, 2025

(54) ORIENTABLE BACK FOR A TIMEPIECE

(71) Applicant: The Swatch Group Research and Development Ltd, Marin (CH)

(72) Inventors: Joël Allimann, Vallon (CH); François Erdemli, Colombier (CH); Enzo Agustoni, Cudrefin (CH)

(73) Assignee: The Swatch Group Research and Development Ltd, Marin (CH)

( * ) Notice: Subject to any disclaimer, the term of this patent is extended or adjusted under 35 U.S.C. 154(b) by 460 days.

(21) Appl. No.: 17/866,945

(22) Filed: Jul. 18, 2022

(65) Prior Publication Data

US 2023/0038234 A1 Feb. 9, 2023

(30) Foreign Application Priority Data

Aug. 9, 2021 (EP) .................................... 21190403

(51) Int. Cl.
*G04B 37/11* (2006.01)

(52) U.S. Cl.
CPC .................................... *G04B 37/11* (2013.01)

(58) Field of Classification Search
CPC . G04B 37/11; G04B 37/0033; G04B 37/0041
USPC .......................................................... 368/282
See application file for complete search history.

(56) References Cited

U.S. PATENT DOCUMENTS

2003/0016591 A1* 1/2003 Meyrat .............. G04B 37/0033 368/309
2008/0225650 A1* 9/2008 Muller ............... G04B 37/0008 368/310
2012/0311862 A1* 12/2012 Knuchel .............. G04B 37/005 29/896.3
2020/0218201 A1* 7/2020 Haering ................. G04B 37/11
2021/0088974 A1 3/2021 Tschumi

FOREIGN PATENT DOCUMENTS

CH 350 251 A 11/1960
CH 710451 A1 * 6/2016 ........... G04B 37/005
JP 2021-51063 A 4/2021

OTHER PUBLICATIONS

European Search Report for EP 21 19 0403 dated Jan. 13, 2022.

* cited by examiner

*Primary Examiner* — Regis J Betsch
*Assistant Examiner* — Kevin Andrew Johnston
(74) *Attorney, Agent, or Firm* — Sughrue Mion, PLLC

(57) ABSTRACT

A device for fastening a back (1) to a middle (2) of a watch case (100), the back (1) being arranged to be driven onto the watch case (100). The device includes a casing ring (3) to which is connected at least one position pin (4), the position pin (4) being arranged to cooperate with at least one machining (10) in the back (1) so as to guarantee the orientation of the back (1) relative to the middle (2) along the 12 o'clock-6 o'clock axis of the watch.

6 Claims, 1 Drawing Sheet

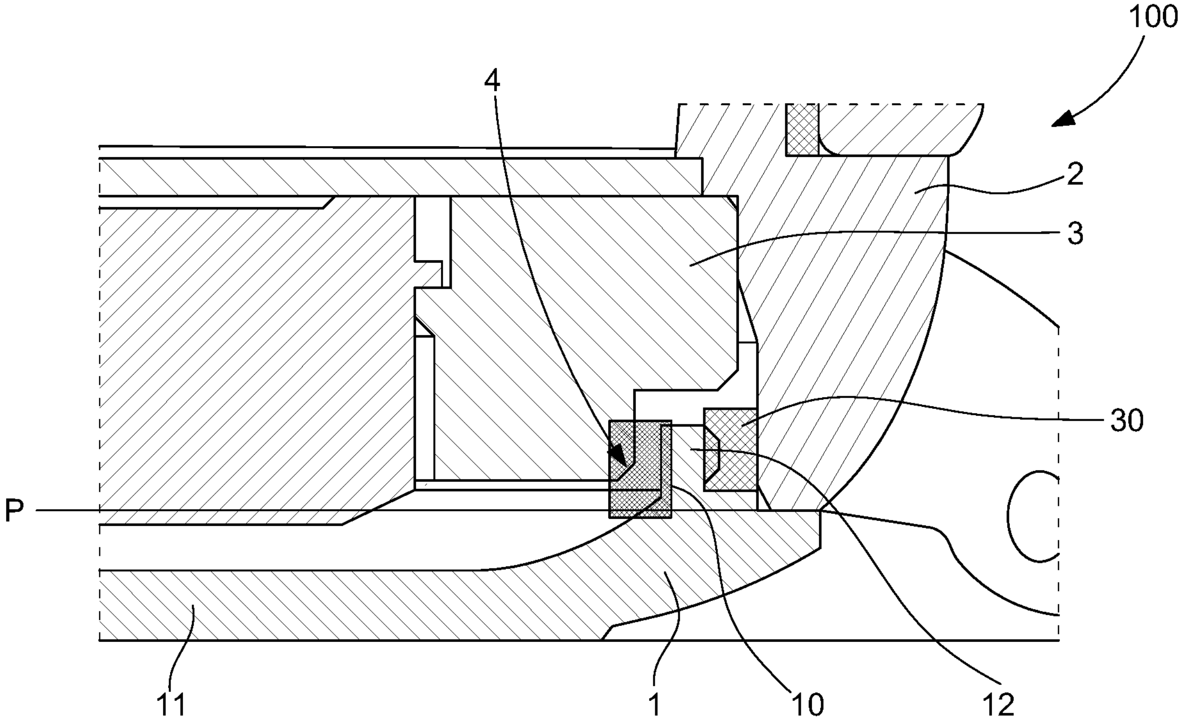
100
4
2
3
30
P
11
1
10
12

ORIENTABLE BACK FOR A TIMEPIECE

CROSS REFERENCE TO RELATED APPLICATION

This application claims priority to European Patent Application No. 21190403.2 filed Aug. 9, 2021, the entire contents of which are incorporated herein by reference.

FIELD OF THE INVENTION

The present invention relates to backs for timepieces and more particularly to such backs that include a pattern or a logo on the external face thereof and wherein said pattern or logo can be oriented as desired.

TECHNOLOGICAL BACKGROUND

It is often the case that, when screwing a watch case back onto the middle thereof, it is observed that, when the back is fully screwed in, the decorative patterns or inscriptions that may have been, for example, stamped or etched on the face of the back situated on the same side as the wrist of the individual wearing the watch, are not properly aligned relative to the 12 o'clock-6 o'clock vertical axis of said watch which is clearly detrimental to the aesthetics of this watch.

This aesthetic defect, which may be tolerable for low-cost watches, constitutes a very significant drawback for more expensive watches.

In order to overcome this drawback, the only known solution to date consists of pairing a back with a specific watch case during machining, so as to ensure that once fully screwed in, the back is perfectly aligned with the 12 o'clock-6 o'clock axis of the watch. However, this solution is not very satisfactory since it creates problems in the event that the original back of the watch is lost or damaged and must be replaced by another back, for which it cannot be guaranteed that once screwed on the middle, it will be properly aligned with the 12 o'clock-6 o'clock vertical axis.

SUMMARY OF THE INVENTION

The purpose of the present invention is to overcome this drawback, in addition to other drawbacks, by proposing a system enabling, after screwing a back onto the middle of a watch case, the orientation of the back to be adjusted in a simple and effective manner relative to the watch, so as to guarantee the proper disposition of the inscriptions and other decorative patterns that have been inscribed on the face of the back of the watch facing the wrist of the individual wearing this watch.

For this purpose, the present invention relates to a device for fastening a back to a middle of a watch case, the back being arranged to be driven onto the watch case, characterised in that it comprises a casing ring to which is connected at least one position pin, said position pin being arranged to cooperate with at least one machining in the back so as to guarantee the orientation of the back relative to the middle along the 12 o'clock-6 o'clock axis of the watch.

Thanks to these features, the present invention provides a device for fastening a back of a watch case, allowing this back to be completely driven onto the middle of the watch to ensure the leakproof sealing thereof, as well as allowing the back to be oriented correctly relative to the middle along the 12 o'clock-6 o'clock axis of the watch.

According to other advantageous alternative embodiments of the invention:

- the position pin is a pin that is driven into the casing ring;
- the position pin and the casing ring make up an element made in one piece;
- said at least one machining has a shape that complements that of the position pin;
- the device comprises a ring gasket made of a compressible material, said gasket being placed between the back and the middle to procure the leakproof seal;
- the position pin projects from the joining plane between the back and the middle so as to guide the back on the middle.

The invention further relates to a timepiece comprising a fastening device according to the invention.

BRIEF DESCRIPTION OF THE FIGURES

The purposes, advantages and features of the device for fastening a back to a middle of a watch case will appear more clearly in the following description which is given on the basis of at least one non-limiting embodiment shown by way of the drawing, in which:

FIG. 1 is a sectional view of a watch case provided with a device for fastening a back to a middle according to the invention.

DETAILED DESCRIPTION

FIG. 1 shows a device for fastening and orienting a back 1 on a middle 2 of a watch case, the back 1 being intended to be driven onto the middle 2.

According to the invention, the device comprises a casing ring 3 to which is connected at least one position pin 4 arranged to cooperate with at least one machining 10 in the back 1 so as to guarantee the orientation of the back 1 relative to the middle 2 along the 12 o'clock-6 o'clock axis of the watch, the back 1 including an outer face bearing a pattern such as a logo or a trademark.

As can be seen in FIG. 1, the back consists of a skirt 11 and a ring 12 projecting from the skirt, the ring being arranged to rest in the middle 2 once the back 1 has been driven.

According to a first embodiment, the position pin 4 takes the form of a pin which is driven into the casing ring 3, the casing ring 3 having an orifice arranged to receive the pin.

According to a second embodiment, the position pin 4 and the casing ring 3 make up an element made in one piece. They can, for example, be manufactured by plastic injection or moulding, or they can be integrally machined from solid blocks. The advantage of this embodiment is that it is simpler to implement and less expensive to produce.

Thanks to such an assembly, the angular rotation of the back 1 relative to the middle 2 is blocked (and thus so is the position thereof) by the position pin 4 which engages in the back 1 when driven therein.

In order to limit the play as much as possible once completely assembled, said at least one machining 10 has a shape that complements the position pin 4, the position pin being arranged to be forcefully inserted into the machining 10 in the back 1.

According to the invention, a ring gasket 30 made of a compressible material is placed between the back 1 and the middle 2, and more specifically outside the ring 12 of the back to procure the leakproof seal once the back has been assembled onto the middle.

Advantageously, the position pin 4 projects slightly from the joining plane P between the back 1 and the middle 2 so as to also act as a guiding element during the assembly of the back 1 on the middle 2, the position pin 4 engaging with the back 1 or the casing ring 3 before the ring gasket 30 starts to become compressed.

The casing ring 3 and the position pin 4 can be made of plastics material in the event that they form a one-piece element. Conversely, the position pin 4 can be made of a metal or plastics material.

The fastening device according to the invention is mounted as follows. The movement and the casing ring 3 are mounted in the middle 2. Once the casing ring 3 has been fastened into the middle 2, the back 1 is placed relative to the position pin 4 so that the latter is partially inserted into the machining 10 in the back 1. Once the back 1 has been placed and the position pin 4 has been partially inserted into the machining 10, the back 1 is driven onto the middle 2 until the back comes to abut against the middle 2.

It goes without saying that the invention is not limited to the embodiment described above and that various simple alternatives and modifications can be considered while still remaining within the scope of the invention. By way of example, the position pin can also be placed on the back instead of on the casing ring.

The invention claimed is:

1. A device for fastening a back (1) to a middle (2) of a watch case (100), the back (1) being arranged to be driven onto the middle (2) and having a pattern thereon, the device comprising a casing ring (3) to which is connected at least one position pin (4), said position pin (4) being arranged to cooperate with at least one machining (10) in the back (1) so as to lock an angular rotation of the back (1), in a plane parallel to the back (1), at an orientation in which the pattern on the back (1), relative to the middle (2), is aligned with the 12 o'clock-6 o'clock axis of the watch, wherein the position pin (4) is a pin that is driven into the casing ring (3).

2. The device according to claim 1, wherein the position pin (4) and the casing ring (3) make up an element made in one piece.

3. The device according to claim 1, wherein said at least one machining (10) has a shape that complements that of the position pin (4).

4. The device according to claim 1, further comprising a ring gasket (30) made of a compressible material, said ring gasket (30) being placed between the back (1) and the middle (2) to procure a leakproof seal.

5. The device according to claim 1, wherein the position pin (4) projects from a joining plane (P) between the back (1) and the middle (2) so as to guide the back (1) on the middle (2).

6. A timepiece comprising a fastening device according to claim 1.

* * * * *